(12) United States Patent
Golob

(10) Patent No.: US 12,260,734 B2
(45) Date of Patent: Mar. 25, 2025

(54) DETECTING MULTIPLE CHARGERS COUPLED TO THE SAME BATTERY

(71) Applicant: Carrier Corporation, Palm Beach Gardens, FL (US)

(72) Inventor: Michael Golob, Bradenton, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 134 days.

(21) Appl. No.: 18/315,101

(22) Filed: May 10, 2023

(65) Prior Publication Data

US 2023/0377444 A1 Nov. 23, 2023

Related U.S. Application Data

(60) Provisional application No. 63/344,867, filed on May 23, 2022.

(51) Int. Cl.
G08B 21/00 (2006.01)
G08B 21/18 (2006.01)
H02J 7/00 (2006.01)

(52) U.S. Cl.
CPC .......... *G08B 21/187* (2013.01); *H02J 7/0047* (2013.01)

(58) Field of Classification Search
CPC .... G08B 21/187; H02J 7/0047; H02J 7/0013; H02J 7/00032; H02J 7/00045
See application file for complete search history.

(56) References Cited

U.S. PATENT DOCUMENTS 6,274,950 B1 8/2001 Gottlieb et al.
6,803,745 B2 10/2004 Nishida et al.
7,333,010 B2 2/2008 Barrieau et al.
7,400,227 B2 7/2008 Becker et al.
7,459,881 B2 12/2008 Barrieau
(Continued)

FOREIGN PATENT DOCUMENTS

CN 106953387 B 4/2020
EP 1724737 A2 11/2006
(Continued)

OTHER PUBLICATIONS

European Application No. 23174779.1 filed May 23, 2023; Extended European Search Report dated Oct. 20, 2023; 6 pages.

*Primary Examiner* — Toan N Pham
(74) *Attorney, Agent, or Firm* — CANTOR COLBURN LLP

(57) ABSTRACT

According to an embodiment, a controller of a communications network includes a processor that creates a monitoring set of battery chargers by placing a set of battery chargers in a monitoring mode. The processor performs multiple iterations of a multiple-charging source (MCS) detection process. Each multiple iteration of the MCS detection process includes creating an active one of the monitoring set of battery chargers by placing one of the monitoring set of battery chargers in an active state in which the active one of the monitoring set of battery chargers attempts to charge any battery to which the active one of the monitoring set of battery chargers is connected; and logging an error event based at least in part on at least one of the monitoring set of battery chargers detecting charging activity on any battery to which the monitoring set of battery chargers is connected.

20 Claims, 5 Drawing Sheets

(56) References Cited

U.S. PATENT DOCUMENTS

| | | |
|---|---|---|
| 8,143,862 B2 | 3/2012 | Li et al. |
| 9,087,441 B2 | 7/2015 | Gadonniex et al. |
| 9,361,785 B2 | 6/2016 | Barrieau et al. |
| 9,966,791 B2 | 5/2018 | Palmer et al. |
| 9,978,256 B1 | 5/2018 | Norton et al. |
| 10,008,105 B2 | 6/2018 | Barrieau et al. |
| 10,663,501 B2 | 5/2020 | Cianfrocco et al. |
| 10,832,557 B2 | 11/2020 | Barson |
| 10,909,828 B2 | 2/2021 | Barson et al. |
| 11,018,573 B2 | 5/2021 | Cianfrocco |
| 11,088,549 B2 * | 8/2021 | Lim .................... H02J 7/0068 |
| 2013/0187602 A1 | 7/2013 | Bouman |
| 2016/0087472 A1 * | 3/2016 | Sattinger ................ H02J 7/02 |
| | | 320/108 |
| 2016/0134160 A1 | 5/2016 | Schultz et al. |
| 2019/0058339 A1 | 2/2019 | Sergyeyenko |
| 2019/0334740 A1 | 10/2019 | Mohiuddin et al. |
| 2021/0057929 A1 * | 2/2021 | Li ........................ H02J 7/0071 |
| 2022/0123567 A1 * | 4/2022 | Truettner ............ H02J 7/00032 |
| 2024/0022073 A1 * | 1/2024 | McCormick ............ B60L 53/63 |

FOREIGN PATENT DOCUMENTS

| | | |
|---|---|---|
| EP | 2226885 B1 | 5/2013 |
| EP | 2701132 B1 | 7/2018 |
| KR | 20140114175 A | 9/2014 |
| WO | 03048796 A1 | 6/2003 |
| WO | 2021143747 A1 | 7/2021 |
| WO | 2021143748 A1 | 7/2021 |
| WO | 2022003441 A1 | 1/2022 |

\* cited by examiner

DETECTING MULTIPLE CHARGERS COUPLED TO THE SAME BATTERY

CROSS-REFERENCE TO RELATED APPLICATIONS

This application claims the benefit of U.S. Provisional Application No. 63/344,867 filed May 23, 2022, the disclosure of which is incorporated herein by reference in its entirety.

BACKGROUND

Exemplary embodiments relate in general to detecting multiple chargers coupled to the same single battery unit or battery set.

Building-safety control systems can include a rechargeable battery system having sufficient power capacity to keep the building-safety control system running for a specified period after the main AC power source has been interrupted. To satisfy such power capacity requirements, the rechargeable battery system can include multiple battery units or sets, and each battery unit/set can be provided with its own corresponding battery charger having charging parameters (e.g., current, voltage, power) that are matched to the charging parameters of the charger's battery unit/set.

Mistakenly or inappropriately coupling a battery unit/set to multiple distinct battery chargers at the same time can damage a battery unit/set that was designed to be charged by a single charger at certain charging parameters. In this scenario, the multiple distinct battery chargers can expose the battery unit/set to charging parameters at excessive levels. Damaged battery units/sets can prevent the rechargeable battery system from meeting the time requirements for keeping the building-safety controls system active, which can result in the building-safety control system missing an alarm condition.

BRIEF DESCRIPTION

According to an embodiment, a controller of a communications network is provided. The controller includes a processor operable to create a monitoring set of battery chargers by placing a set of battery chargers in a monitoring mode. The processor is further operable to perform multiple iterations of a multiple-charging source (MCS) detection process. Each of the multiple iterations of the MCS detection process includes creating an active one of the monitoring set of battery chargers by placing one of the monitoring set of battery chargers in an active state in which the active one of the monitoring set of battery chargers attempts to charge any battery to which the active one of the monitoring set of battery chargers is connected; and logging an error event based at least in part on at least one of the monitoring set of battery chargers detecting charging activity on any battery to which the monitoring set of battery chargers is connected.

In addition to one or more of the features described above, or as an alternative to any of the foregoing embodiments, the MCS detection process further includes deactivating the active one of the set of battery chargers.

In addition to one or more of the features described above, or as an alternative to any of the foregoing embodiments, the monitoring mode includes each of the monitoring set of battery chargers being operable to detect a charging signal on any battery connected to one of the monitoring set of battery chargers.

In addition to one or more of the features described above, or as an alternative to any of the foregoing embodiments, the processor is operable to synchronize the set of battery chargers.

In addition to one or more of the features described above, or as an alternative to any of the foregoing embodiments, synchronizing the set of battery chargers includes deactivating a charging function of each of the set of battery chargers.

In addition to one or more of the features described above, or as an alternative to any of the foregoing embodiments, creating the active one of the monitoring set of battery chargers occurs during a time slot allocated to the active one of the monitoring set of battery chargers.

In addition to one or more of the features described above, or as an alternative to any of the foregoing embodiments, the time slot is allocated using a time division multiple access (TDMA) scheme.

In addition to one or more of the features described above, or as an alternative to any of the foregoing embodiments, the communications network includes a building-safety control (BSC) system.

In addition to one or more of the features described above, or as an alternative to any of the foregoing embodiments, the controller is operable to initiate a response based at least in part on the error event.

In addition to one or more of the features described above, or as an alternative to any of the foregoing embodiments, the response is selected from the group consisting of activating an alarm; deactivating the at least one of the monitoring set of battery chargers that detects charging activity on any battery to which the monitoring set of battery chargers is connected; and initiating an electronic help process that guides a user on how to address the error event.

According to another embodiment, a method of operating a controller of a communications network is provided. The method includes using a processor to create a monitoring set of battery chargers by placing a set of battery chargers in a monitoring mode. The method further includes using the processor to perform multiple iterations of a multiple-charging source (MCS) detection process. Each of the multiple iterations of the MCS detection process includes creating an active one of the monitoring set of battery chargers by placing one of the monitoring set of battery chargers in an active state in which the active one of the monitoring set of battery chargers attempts to charge any battery to which the active one of the monitoring set of battery chargers is connected; and logging an error event based at least in part on at least one of the monitoring set of battery chargers detecting charging activity on any battery to which the monitoring set of battery chargers is connected.

In addition to one or more of the features described above, or as an alternative to any of the foregoing embodiments, the MCS detection process further includes deactivating the active one of the set of battery chargers.

In addition to one or more of the features described above, or as an alternative to any of the foregoing embodiments, the monitoring mode includes each of the monitoring set of battery chargers being operable to detect a charging signal on any battery connected to one of the monitoring set of battery chargers.

In addition to one or more of the features described above, or as an alternative to any of the foregoing embodiments, the method further including using the processor to synchronize the set of battery chargers.

In addition to one or more of the features described above, or as an alternative to any of the foregoing embodiments, synchronizing the set of battery chargers includes deactivating a charging function of each of the set of battery chargers.

In addition to one or more of the features described above, or as an alternative to any of the foregoing embodiments, creating the active one of the monitoring set of battery chargers occurs during a time slot allocated to the active one of the monitoring set of battery chargers.

In addition to one or more of the features described above, or as an alternative to any of the foregoing embodiments, the time slot is allocated using a time division multiple access (TDMA) scheme.

In addition to one or more of the features described above, or as an alternative to any of the foregoing embodiments, the communications network includes a building-safety control (BSC) system.

In addition to one or more of the features described above, or as an alternative to any of the foregoing embodiments, the method further including using the controller to initiate a response based at least in part on the error event.

In addition to one or more of the features described above, or as an alternative to any of the foregoing embodiments, the response is selected from the group consisting of: activating an alarm; deactivating the at least one of the monitoring set of battery chargers that detects charging activity on any battery to which the monitoring set of battery chargers is connected; and initiating an electronic help process that guides a user on how to address the error event.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
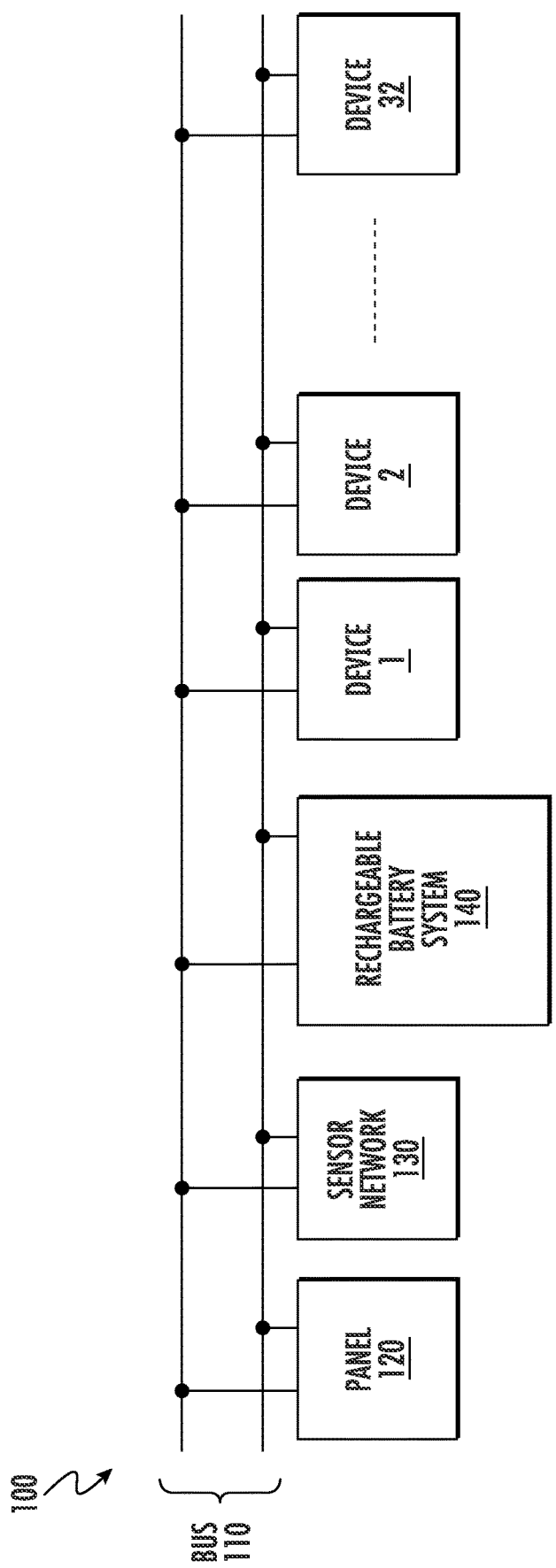
FIG. 1 is a block diagram of a building-safety control system operable to implement a multiple-charging-source detection process according to an embodiment.

A detailed description of one or more embodiments of the disclosed systems and methods are presented herein by way of exemplification and not limitation with reference to the Figures.

Embodiments of the present disclosure provide computer systems and computer-implemented methods of a building-safety control system operable to implement a multiple-charging-source detection process. In embodiments of the disclosure, the multiple-charging-source detection process is operable to detect and substantially prevent or interrupt the power coupling of multiple chargers to a single battery unit or battery set of the building-safety control system at the same time, thereby preventing (or at least mitigating) the battery unit/set from being damaged by the multiple chargers.

In embodiments of the disclosure, the building-safety control system includes a processor-based control panel coupled through a communications network to a variety of smart devices or systems such as a sensor network (e.g., electronic heat and smoke sensors), processor-controlled safety devices (e.g., sprinkler systems, smoke alarms, and the like), and processor-controlled general building systems (e.g., ventilating systems, elevator systems, and the like). In general, the adjectives "smart" and/or "connected" are often used to describe the use of computer-based, networked technologies to augment the features of a device or a system. Smart/connected devices are embedded with processors, sensors, software, and connectivity that allow data about the device to be gathered, processed, and transmitted to external systems. The data collected from smart/connected devices can be analyzed and used to inform decision-making and enable operational efficiencies of the device. The building-safety system is operable to monitor the sensor network; detect a potential building emergency based on the sensor network; and initiate a variety of responses to the detected building emergency, including, for example, activating audible alarms, automatically notifying local fire departments, activating building sprinkler systems, shutting down ventilating systems, shutting down elevators, and the like.

Because building emergencies can include a kiss of AC power, the building-safety control system includes a rechargeable battery system having enough battery units/sets to provide sufficient stored power capacity to keep the building-safety control system running for a specified period after the main AC power source is interrupted. To satisfy such stored power capacity requirements, the rechargeable battery system can include multiple battery units or sets, and each battery unit/set is provided with its own corresponding battery charger having charging parameters (e.g., current, voltage, power) that are matched to the charging parameters of the charger's battery unit/set.

Mistakenly or inappropriately coupling one of the battery units/sets to multiple distinct battery chargers at the same time could, without benefit of embodiments of the present disclosure, damage the battery unit/set, which was designed to be charged by a single charger at certain charging parameters. In this scenario, the multiple distinct battery chargers could, without benefit of embodiments of the present disclosure, expose the battery unit/set to charging parameters at excessive levels. Damaged battery units/sets may prevent the rechargeable battery system from meeting the time requirements for keeping the building safety controls system active, which may result in the building-safety control system missing an alarm condition.

In accordance with embodiments of the disclosure, the multiple-charging source detection process detects when the building-safety control system has been mistakenly or inappropriately configured (e.g., by a user) such that more than one power supply can charge a given battery unit/set of the rechargeable battery system at the same time. Accordingly, the multiple-charging source detection process substantially prevents or interrupts the battery damage that can result from more than one power supply charging a given battery unit/set at the same time.

In some embodiments, the multiple-charging source detection process is operable to control the building-safety control system to periodically send a synchronization pulse out to the battery chargers. When the synchronization pulse is received, each charger turns its charging functionality off and begins monitoring its connections to the battery units/sets. The battery chargers are controlled such that, subsequent to receiving the synchronization pulse, each battery charger is sequentially activated and deactivated such that only one battery charger is activated at a time. Each active battery charger monitors its connections to the battery units/sets to capture signals that indicate whether the battery unit/set to which the active battery charger is power coupled is also power coupled to another battery charger. If an active battery charger identifies that there is another charger connected to its battery unit/set, the building-safety control system can initiate a variety of responses, including, for example, activating audible alarms, deactivating the misconfigured battery charger(s); activating a charge-control process that prevents more than one of the offending battery chargers from charging the battery unit/set at the same time; initiating an electronic help process that guides a user through how to properly configure the rechargeable battery system and battery chargers of the building-safety system; and the like.

In some embodiments, the multiple-charging source detection process uniquely applies a time division multiple access (TDMA) scheme to the power rail to enable many battery chargers to monitor their connections to the battery units/sets without interference. The TDMA scheme as applied to the charger/battery connections divides the charger/battery connections into different timeslots, and each time slot is allocated to an individual battery unit/set such that only the assigned individual battery unit/set is active during its assigned time slot. For example, if a battery charger is in the fifth (5th) rail position, it will activate during the fifth (5th) TDMA time period and remain disabled during the other TDMA time periods.

Details of how the disclosed multiple-charging source detection process can be implemented in accordance with embodiments of the disclosure are described in greater detail subsequently herein and are illustrated in the accompanying figures.

With reference now to FIG. 1, embodiments of the disclosure can be applied to a variety of communications networks, including but not limited to a building-safety control (BSC) system 100. In accordance with embodiments of the disclosure, the BSC system 100 is operable to implement a multiple-charging source detection process according to embodiments. The BSC system 100 is depicted in FIG. 1 as a simplified diagram illustrating a processor-based control panel 120, s smart sensor network 130, a rechargeable battery system 140, and multiple connected smart devices 1-32 in communication over a bus 110. In embodiments of the disclosure, the sensor network 130 can include, for example, electronic heat and smoke sensors; the rechargeable battery system 140 can include a plurality of battery units/sets (e.g., Battery Set 1 and Battery Set 2 shown in FIG. 2); and the smart devices 1-32 can include, for example, processor-controlled safety devices (e.g., sprinkler systems, smoke alarms, and the like) and processor-controlled general building systems (e.g., ventilating systems, elevator systems, and the like). The BSC system 100 is operable to monitor the smart sensor network 130; detect a potential building emergency based on the smart sensor network 130; and initiate a variety of responses to the detected building emergency, including, for example, activating audible alarms, automatically notifying local fire departments, activating building sprinkler systems, shutting down ventilating systems, shutting down elevators, and the like. The various processor-based operations of the BSC system 100 described herein can be allocated in any manner among the devices and systems that make up the BSC system 100.

Figure 2:
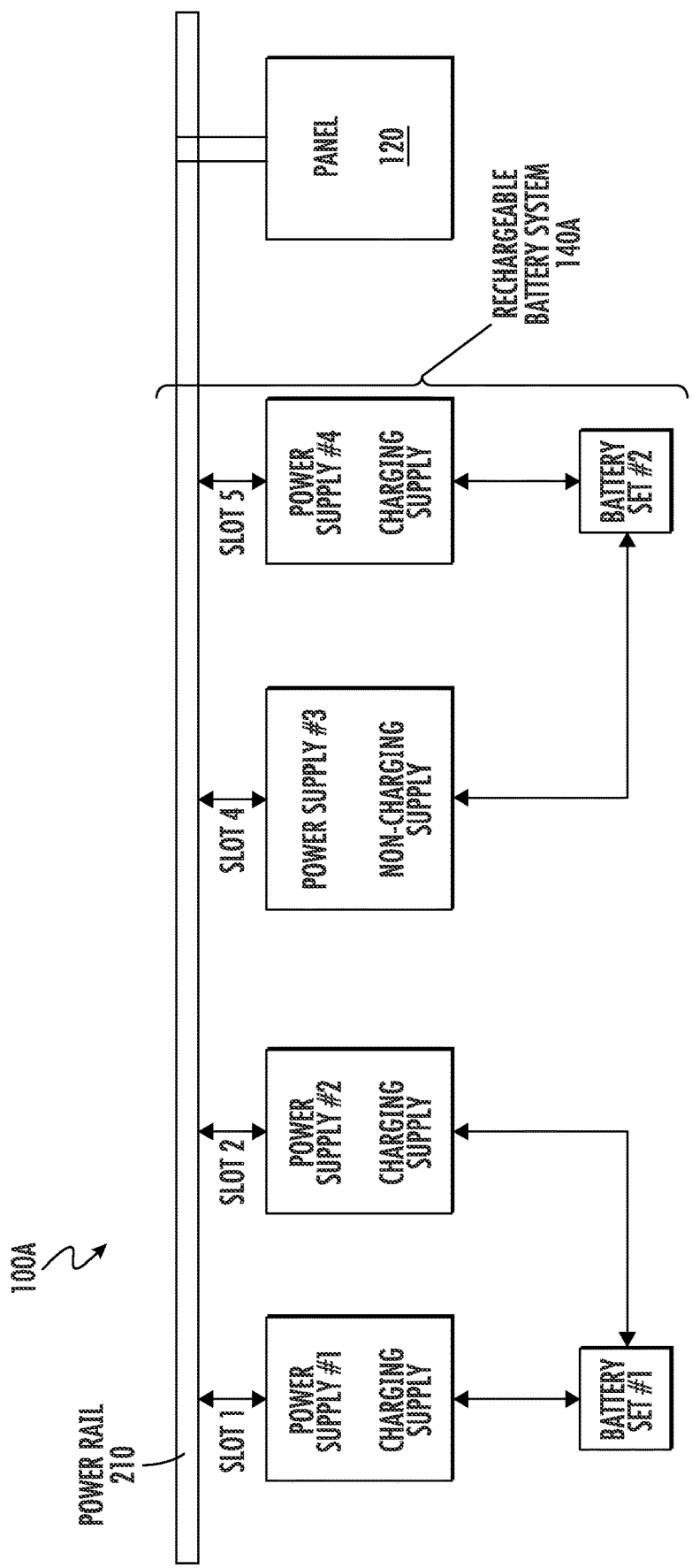
FIG. 2 is a block diagram illustrating a rechargeable battery system of a building-safety control system according to an embodiment.

FIG. 2 depicts a BSC system 100A, which illustrates a portion of the BSC system 100 (shown in FIG. 1). The BSC system 100A illustrates the panel 110 in communication with various power supplies (Power Supply #1, Power Supply #2, Power Supply #3, and Power Supply #4) and battery units/sets (e.g., Battery Set #1 and Battery Set #2) of a rechargeable battery system 140A over a power rail 210. The various power supplies are operable to include various charging supplies (a Charging Supply of Power Supply #1; a Charging Supply of Power Supply #2; and a Charging Supply of Power Supply #4) that are operable to charge the battery units/sets (Battery Set #1 and/or Battery Set #2). The rechargeable battery system 140A depicts additional details of how the rechargeable battery system 140 (shown in FIG. 1) can be implemented in accordance with embodiments of the disclosure.

Because building emergencies can include a loss of AC power, the rechargeable battery systems 140, 140A include enough battery units/sets (Battery Set #1 and Battery Set #2) to provide sufficient stored power capacity to keep the BSC system 100, 100A running for a specified period after the main AC power source is interrupted. To satisfy such stored power capacity requirements, the rechargeable battery system 140A includes multiple battery units/sets (Battery Set #1 and Battery Set #2), and each battery unit/set is provided with its own corresponding battery charger (Charging Supply of Power Supply #1; Charging Supply of Power Supply #2; or Charging Supply of Power Supply #4) having charging parameters (e.g., current, voltage, power) that are matched to the charging parameters of the charger's corresponding battery unit/set. For example, the Charging Supply of Power Supply #1 is provided with charging parameters (e.g., current, voltage, power) matched to the charging parameters (current, voltage, power) of Battery Set #1 alone or Battery Set #2 alone; the Charging Supply of Power Supply #2 is provided with charging parameters (e.g., current, voltage, power) matched to the charging parameters (current, voltage, power) of Battery Set #1 alone or Battery Set #2 alone; and the Charging Supply of Power Supply #4 is provided with charging parameters (e.g., current, voltage, power) matched to the charging parameters (current, voltage, power) of Battery Set #1 alone or Battery Set #2 alone. Power Supply #3 has a Non-charging Supply.

As shown in FIG. 2, the reconfigurable battery system 140A has been mistakenly or inappropriately configured (e.g., by a user) such that Battery Set #1 is coupled to the Charging Supply of Power Supply #1 and the Charging Supply of Power Supply #2. Embodiments of the disclosure implement a multiple-charging source detection process (e.g., methodology 300 shown in FIG. 3, and/or methodology 400 shown in FIG. 4) operable to detect that Battery Set #1 is coupled to the Charging Supply of Power Supply #1 and the Charging Supply of Power Supply #2, thereby avoiding (or at least mitigating) the damage to Battery Set #1 (which was designed to be charged by a single charger at certain charging parameters) that would result from the Charging Supply of Power Supply #1 and the Charging Supply of Power Supply #2 attempting to charge Battery Set #1 at the same time.

In accordance with some embodiments of the disclosure, the multiple-charging source detection process is operable to control the BSC control system 100 to periodically send a synchronization pulse out to Power Supply #1, Power Supply #2, Power Supply #3, and Power Supply #4. When the synchronization is received, each Power Supply turns its Charging Supply off and begins charging supply/batter unit/set connections. The Charging Supplies are controlled such that, subsequent to receiving the synchronization pulse, each Charging Supply is sequentially activated and deactivated such that only one Charging Supply is activated at a time. Each active Charging Supply monitors its connection to a battery unit/set to capture signals that indicate whether the battery unit/set to which the active Charging Supply is power coupled is also power coupled to another Charging Supply. If an active Charging Supply identifies that there is another charger connected to its battery unit/set, and the BSC system 100, 100A can initiate a variety of responses, including, for example, activating audible alarms, deactivating the mis-configured battery charger(s); activating a charge-control process that prevents more than one of the mis-configured battery chargers from charging the battery unit/set at the same time; initiating an electronic help process that guides a user through how to properly configure the rechargeable battery system 140A and the Charging Supplies of the BSC system 100; and the like.

Figure 3:
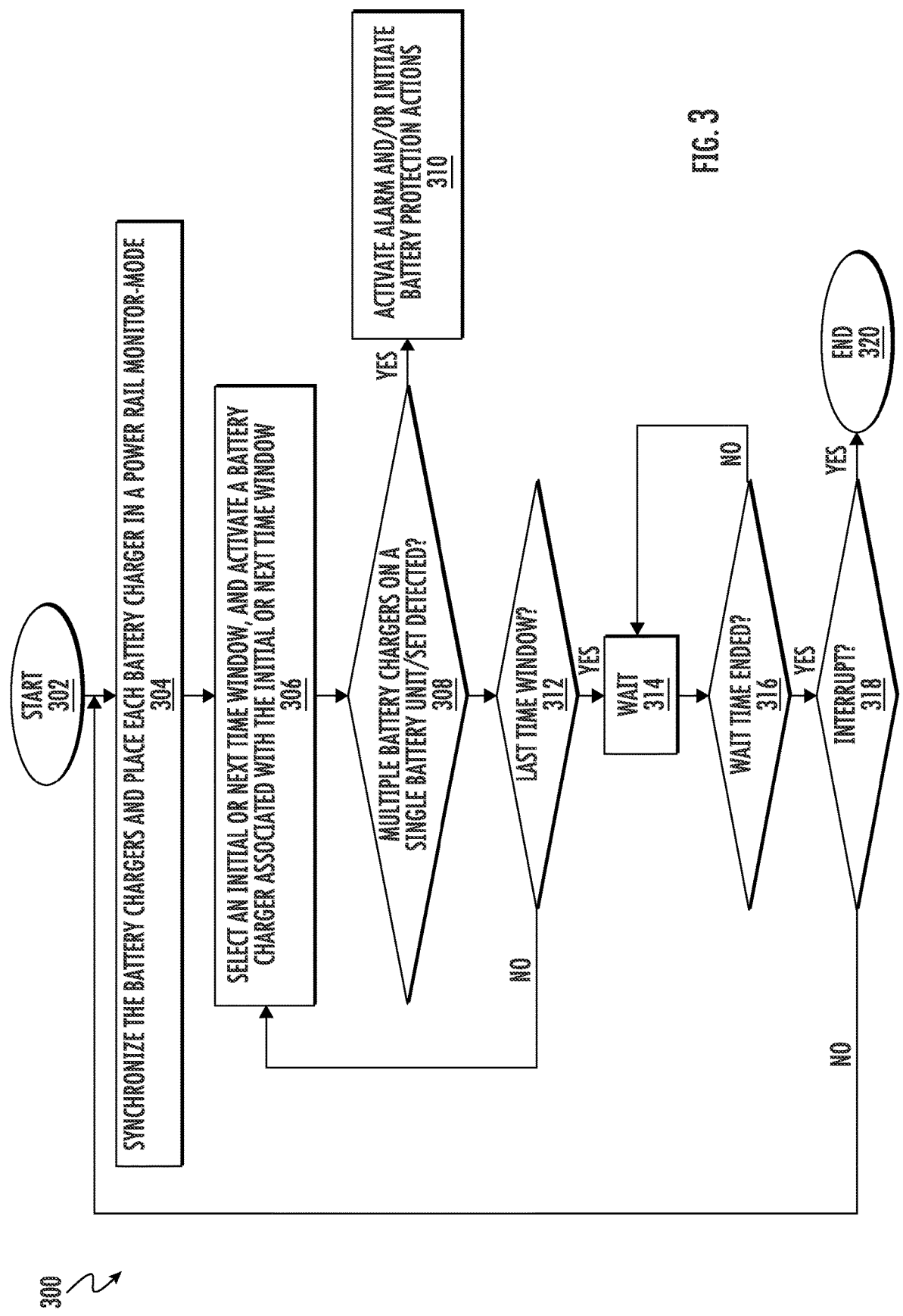
FIG. 3 is a flow diagram illustrating aspects of a multiple-charging-source detection process according to an embodiment.

FIG. 3 is a flow diagram illustrating a methodology 300 in accordance with embodiments. The methodology 300 is implemented by the protocol of a communications network, such as the BSC system 100, 100A (shown in FIGS. 1 and 2), to perform a multiple-charging source detection process in accordance with embodiments of the disclosure. As with other network protocols, the network protocol of the BSC system 100, 100A is a set of established rules that dictate how to format, transmit and receive data so that computer network devices—from servers and routers to endpoints—can communicate, regardless of the differences in their underlying infrastructures, designs or standards. To successfully send and receive information, devices on both sides of a communication exchange must accept and follow protocol conventions. The network protocols of the BSC system 100, 100A can be built into software, hardware or both at any component of the BSC system 100, 100A.

The methodology 300 begins at block 302 then moves to block 304 where the battery chargers (e.g., the Charging Supply of Power Supply #1; the Charging Supply of Power Supply #2; and the Charging Supply of Power Supply #4) and a second device (e.g., Device 1) are synchronized (i.e., deactivated substantially at the same time) and placed in a charging supply/battery unit/set monitor mode when a signal is received at the battery chargers to start the methodology 300. Each battery charger is assigned to one of a sequence of time windows. During its assigned time window, the battery charger will be active (i.e., it will attempt to charge), and outside of its assigned time window, the battery charger is inactive. At block 306, the methodology 300 selects an initial or next time window and activates the battery charger associated with that initial or next time window.

From block 306, the methodology moves to decision block 308 and determines whether or not the currently active battery charger is one of multiple battery chargers are on a single battery unit/set. In some embodiments, the inquiry at decision block 308 is based on determining whether any of the inactive battery chargers are detecting a voltage on the power rail 210. If the active battery charger is coupled to one battery unit/set and no inactive battery charger is coupled to that same battery unit/set, the inactive battery chargers, which are in monitor mode, should not detect any voltage its connection to its battery unit/set. However, if the active battery charger is coupled to one battery unit/set and at least one of the inactive battery chargers is also coupled to that same battery unit/set, the inactive battery chargers, which are in monitor mode, will detect voltage on its battery charger/battery unit/set, and a conclusion can be drawn that the active battery charger and the inactive battery charger(s) that detected a voltage are coupled to the same battery unit/set. Accordingly, if the answer to the inquiry at decision block 308 is yes, the methodology 300 moves to block 310 and activates and alarm and/or initiates battery damage protection actions of the type previously described herein. If the answer to the inquiry at decision block 308 is no, the methodology 300 moves to decision block 312 to determine whether the initial or next time window is the last time window in the sequence of time windows. If the answer to the inquiry at decision block 312 is no, the methodology 300 returns to block 306 and begins processing the next time window and the active battery charger assigned to the next time window. If the answer to the inquiry at decision block 312 is yes, the methodology 300 moves to block 314 and waits. From block 314, the methodology 300 moves to decision block 316 and determines whether or not the wait time between one sequence of time windows and a next sequence of time windows has ended. If the answer to the inquiry at decision block 316 is no, the methodology 300 returns to block 314 and waits again. If the answer to the inquiry at decision block 316 is yes, the methodology 300 moves to decision block 318 to determine whether any kind of interrupt request has been received. If the answer to the inquiry at decision block 318 is yes, the methodology 300 moves to block 318 and ends. If the answer to the inquiry at decision block 318 is no, the methodology 300 returns to block 304 to perform another iteration of the methodology 300 to again determine whether or not more than one battery charger is communicatively coupled to the same battery unit/set.

Figure 4:
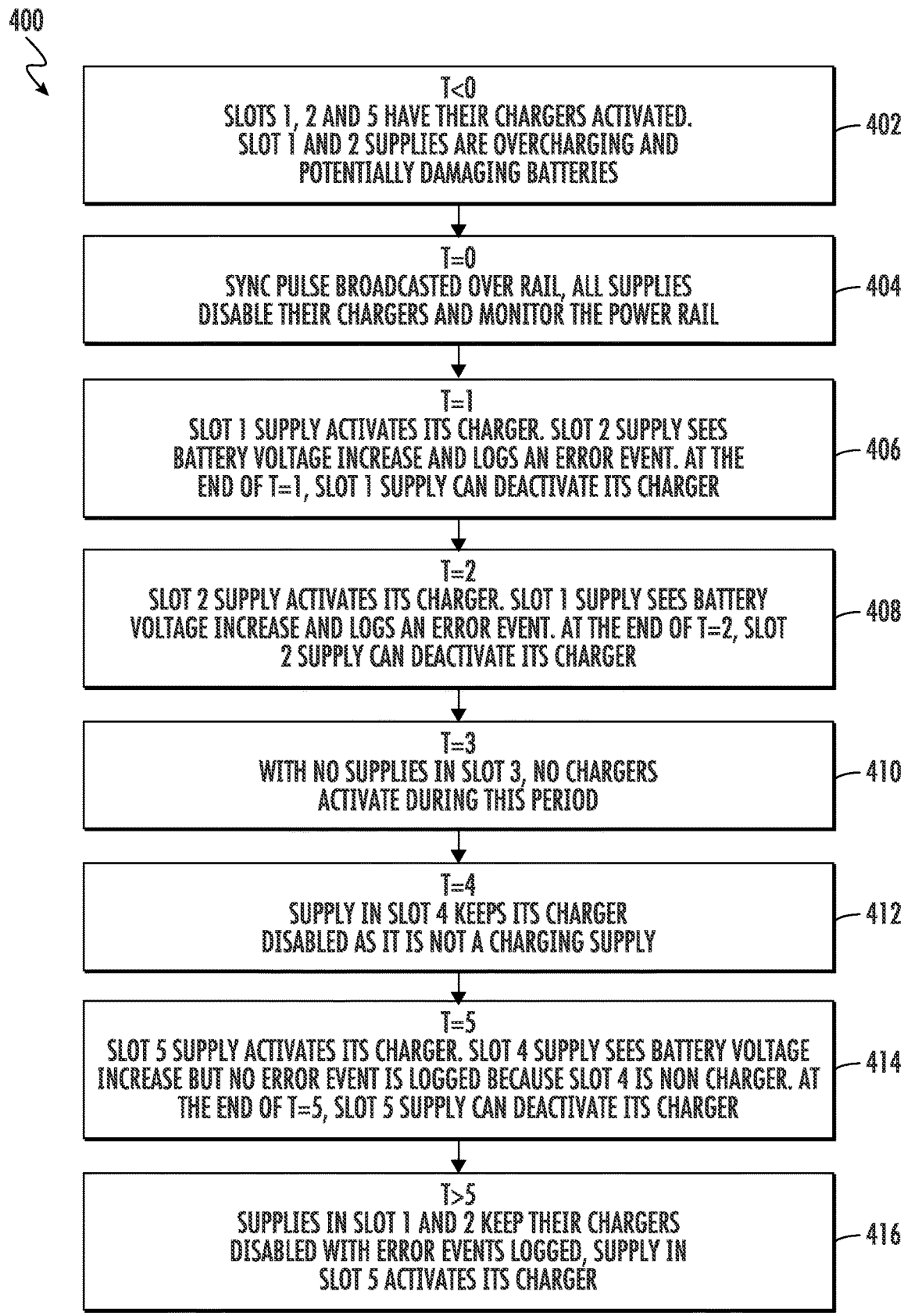
FIG. 4 is a flow diagram illustrating aspects of a multiple-charging-source detection process according to an embodiment.

FIG. 4 depicts a flow diagram illustrating a non-limiting example of how the disclosed multiple-charging source detection process can be implemented by a methodology 400 applied using the BSC system 100A shown in FIG. 2. Each block of the methodology 400 is identified by its time slot (e.g., T<0, T=0, T=1, etc.) within a TDMA sequence. The methodology 400 begins at block 402, which represents the mis-configured or error state depicted in FIG. 2, where, at time (T) less than zero (0), Battery Set #1 is coupled to the Charging Supply of Power Supply #1 and the Charging Supply of Power Supply #2 at the same time. More specifically, Power Supply #1 at Slot 1, Power Supply #2 at Slot 2, and Power Supply #4 at Slot 5 have their Charging Supplies activated, and the Charging Supplies at Slots 1 and 2 are overcharging and potentially damaging Battery Set #1. At block 404, T is equal to zero (0), and a synchronization pulse is broadcast over the power rail 210. The synchronization pulse instructs all of the Power Supplies to disable their Charging Supplies and go into a monitoring mode in which each Power Supply monitors the connections of its Charging Supply to the battery units/sets. At block 406, T is equal to one (1), and Power Supply #1 assigned to Slot 1 activates its Charging Supply. Although Power Supply #2 at Slot 2 has deactivated its Charging Supply, Power Supply #2 is monitoring the connections, if any, of its Charging Supply to the battery units/sets. Because Power Supply #2 is coupled to Battery Set #1, Power Supply #2 sees the voltage activity on Battery Set #1 that results from Power Supply #1 using its Charging Supply to charge Battery Set #1 and determines therefrom that the Charging Supply of Power Supply #1 and the Charging Supply of Power Supply #2 are improperly coupled to Battery Set #1 and generates and logs an error event. In some embodiments, the error event identifies that the Charging Supply of Power Supply #1 and the Charging Supply of Power Supply #2 are improperly coupled to Battery Set #1. At the end of T equals one (1), Power Supply #1 can deactivate its Charging Supply.

At block 408, T is equal to two (2), and Power Supply #2 assigned to Slot 2 activates its Charging Supply. Although Power Supply #1 at Slot 1 has deactivated its Charging Supply, Power Supply #1 is monitoring the connections, if any, of its Charging Supply to the battery units/sets. Because Power Supply #1 is coupled to Battery Set #1, Power Supply #1 sees the voltage activity on Battery Set #1 that results from Power Supply #2 using its Charging Supply to charge Battery Set #1 and determines therefrom that the Charging Supply of Power Supply #1 and the Charging Supply of Power Supply #2 are improperly coupled to Battery Set #1 and generates and logs an error event. In some embodiments, the error event identifies that the Charging Supply of Power Supply #1 and the Charging Supply of Power Supply #2 are improperly coupled to Battery Set #1. At the end of T equals two (2), Power Supply #2 can deactivate its Charging Supply.

At block 410, T is equal to three (3). However, because no power supplies are coupled to the power rail 210 at Slot 3, no charger supplies are activated during T equals three (3).

At block 412, T is equal to four (4), and Power Supply #3 assigned to Slot 4 keeps its Non-Charging Supply disabled as it is not a charging supply.

At block 414, T is equal to five (5), and Power Supply #4 assigned to Slot 5 activates its Charging Supply. Although Power Supply #3 at Slot 4 has deactivated its Charging Supply, Power Supply #3 is monitoring the connections, if any, of its Charging Supply to the battery units/sets. Because Power Supply #3 is coupled to Battery Set #2, Power Supply #3 sees the voltage activity on Battery Set #2 that results from Power Supply #4 using its Charging Supply to charge Battery Set #2, but no error event is logged because Power Supply #3 has a Non-Charging Supply. At the end of T equals five (5), Power Supply #4 can deactivate its Charging Supply.

Block 416 represents the ongoing state of the BSC system 100A and the rechargeable battery system 140A after the operations at blocks 404, 406, 408, 410, 412, 414. At T greater than five (5), the Charging Supplies at Power Supply #1 and Power Supply #2 remain disabled with error events logged, while the Power Supply #4 at Slot 5 activates its Battery Charger.

Figure 5:
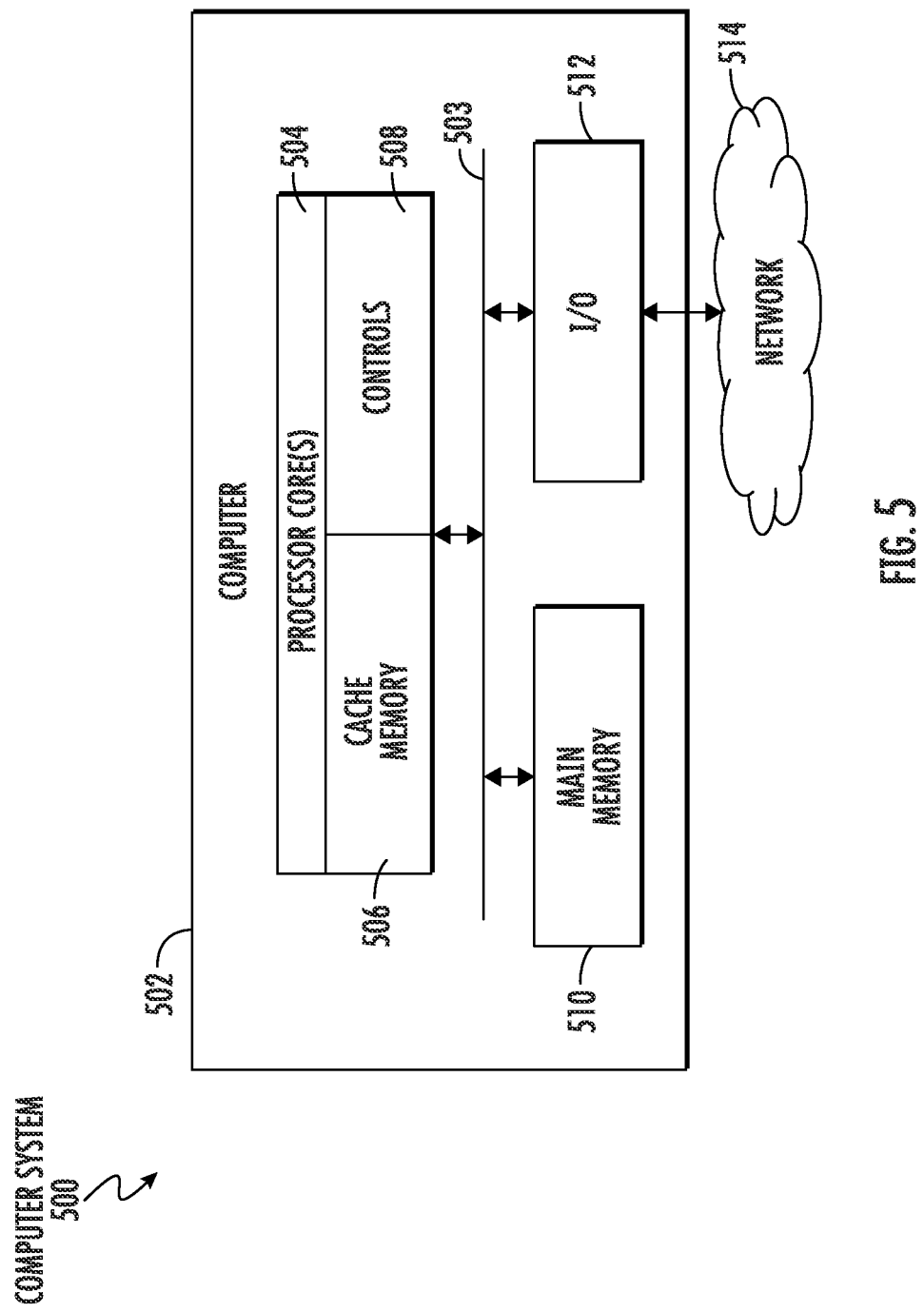
FIG. 5 is a block diagram of a programmable computer system operable to implement aspects of a multiple-charging-source detection process according to an embodiment.

FIG. 5 illustrates an example of a computer system 500 that can be used to implement the aspects of the disclosure described herein. The computer system 500 includes an exemplary computing device ("computer") 502 configured for performing various aspects of the content-based semantic monitoring operations described herein in accordance embodiments of the disclosure. In addition to computer 502, exemplary computer system 500 includes network 514, which connects computer 502 to additional systems (not depicted) and can include one or more wide area networks (WANs) and/or local area networks (LANs) such as the Internet, intranet(s), and/or wireless communication network(s). Computer 502 and additional system are in communication via network 514, e.g., to communicate data between them.

Exemplary computer 502 includes processor cores 504, main memory ("memory") 510, and input/output component(s) 512, which are in communication via bus 503. Processor cores 504 includes cache memory ("cache") 506 and controls 508, which include branch prediction structures and associated search, hit, detect and update logic, which will be described in more detail below. Cache 506 can include multiple cache levels (not depicted) that are on or off-chip from processor 504. Memory 510 can include various data stored therein, e.g., instructions, software, routines, etc., which, e.g., can be transferred to/from cache 506 by controls 508 for execution by processor 504. Input/output component(s) 512 can include one or more components that facilitate local and/or remote input/output operations to/from computer 502, such as a display, keyboard, modem, network adapter, etc. (not depicted).

Embodiments of the disclosure described herein can be a system, a method, and/or a computer program product at any possible technical detail level of integration. The computer program product may include a computer readable storage medium (or media) having computer readable program instructions thereon for causing a controller or processor to carry out aspects of the embodiments of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For the sake of brevity, conventional techniques related to making and using the disclosed embodiments may or may not be described in detail herein. In particular, various aspects of computing systems and specific computer programs to implement the various technical features described herein are well known. Accordingly, in the interest of brevity, many conventional implementation details are only mentioned briefly or are omitted entirely without providing the well-known system and/or process details.

Many of the function units of the systems described in this specification have been labeled or described as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the disclosure, the operations performed by the various components, modules, sub-functions, and the like can be distributed differently than shown without departing from the scope of the various embodiments described herein unless it is specifically stated otherwise.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the formal and technical description represented by the informal expression.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A controller of a communications network, the controller comprising:
   a processor operable to create a monitoring set of battery chargers by placing a set of battery chargers in a monitoring mode;
   wherein the processor is further operable to perform multiple iterations of a multiple-charging source (MCS) detection process;
   wherein each of the multiple iterations of the MCS detection process comprises:
      creating an active one of the monitoring set of battery chargers by placing one of the monitoring set of battery chargers in an active state in which the active one of the monitoring set of battery chargers attempts to charge any battery to which the active one of the monitoring set of battery chargers is connected; and
      logging an error event based at least in part on at least one of the monitoring set of battery chargers detecting charging activity on any battery to which the monitoring set of battery chargers is connected.

2. The controller of claim 1, wherein the MCS detection process further comprises deactivating the active one of the monitoring set of battery chargers.

3. The controller of claim 1, wherein the monitoring mode comprises each of the monitoring set of battery chargers being operable to detect a charging signal on any battery connected to one of the monitoring set of battery chargers.

4. The controller of claim 1, wherein the processor is operable to synchronize the set of battery chargers.

5. The controller of claim 4, wherein synchronizing the set of battery chargers comprises deactivating a charging function of each of the set of battery chargers.

6. The controller of claim 1, wherein creating the active one of the monitoring set of battery chargers occurs during a time slot allocated to the active one of the monitoring set of battery chargers.

7. The controller of claim 6, wherein the time slot is allocated using a time division multiple access (TDMA) scheme.

8. The controller of claim 1, wherein the communications network comprises a building-safety control (BSC) system.

9. The controller of claim 1, wherein the controller is operable to initiate a response based at least in part on the error event.

10. The controller of claim 9, wherein the response is selected from the group consisting of:
    activating an alarm;
    deactivating the at least one of the monitoring set of battery chargers that detects charging activity on any battery to which the monitoring set of battery chargers is connected; and
    initiating an electronic help process that guides a user on how to address the error event.

11. A method of operating a controller of a communications network, the method controller comprising:
    using a processor to create a monitoring set of battery chargers by placing a set of battery chargers in a monitoring mode;
    using the processor to perform multiple iterations of a multiple-charging source (MCS) detection process;
    wherein each of the multiple iterations of the MCS detection process comprises:
       creating an active one of the monitoring set of battery chargers by placing one of the monitoring set of battery chargers in an active state in which the active one of the monitoring set of battery chargers attempts to charge any battery to which the active one of the monitoring set of battery chargers is connected; and
       logging an error event based at least in part on at least one of the monitoring set of battery chargers detecting charging activity on any battery to which the monitoring set of battery chargers is connected.

12. The method of claim 11, wherein the MCS detection process further comprises deactivating the active one of the monitoring set of battery chargers.

13. The method of claim 11, wherein the monitoring mode comprises each of the monitoring set of battery chargers being operable to detect a charging signal on any battery connected to one of the monitoring set of battery chargers.

14. The method of claim 11 further comprising using the processor to synchronize the set of battery chargers.

15. The method of claim 14, wherein synchronizing the set of battery chargers comprises deactivating a charging function of each of the set of battery chargers.

16. The method of claim 11, wherein creating the active one of the monitoring set of battery chargers occurs during a time slot allocated to the active one of the monitoring set of battery chargers.

17. The method of claim 16, wherein the time slot is allocated using a time division multiple access (TDMA) scheme.

18. The method of claim 11, wherein the communications network comprises a building-safety control (BSC) system.

19. The method of claim 11 further comprising using the controller to initiate a response based at least in part on the error event.

20. The method of claim 19, wherein the response is selected from the group consisting of:
- activating an alarm;
- deactivating the at least one of the monitoring set of battery chargers that detects charging activity on any battery to which the monitoring set of battery chargers is connected; and
- initiating an electronic help process that guides a user on how to address the error event.

* * * * *